J. W. IVORY.
FASTENING FOR AN ARTIFICIAL TOOTH.
APPLICATION FILED JUNE 11, 1914.

1,134,680.  
Patented Apr. 6, 1915.

WITNESSES  
P. F. Nagle  
H. E. Dieterich

INVENTOR  
James W. Ivory  
BY Diedersheim + Fairbank  
ATTORNEYS

UNITED STATES PATENT OFFICE.

JAMES W. IVORY, OF PHILADELPHIA, PENNSYLVANIA.

FASTENING FOR AN ARTIFICIAL TOOTH.

1,134,680.  Specification of Letters Patent. Patented Apr. 6, 1915.

Application filed June 11, 1914. Serial No. 844,405.

*To all whom it may concern:*

Be it known that I, JAMES W. IVORY, a subject of the King of Great Britain, residing in the city and county of Philadephia, State of Pennsylvania, have invented a new and useful Fastening for an Artificial Tooth, of which the following is a specification.

My invention relates to a fastening for an artificial tooth, and consists of a member which is designed not only as an anchor, but is embedded in the porcelain for the purpose of attachment of the tooth to the plate material, but possesses also the feature of strengthening the tooth by the introduction of the anchor into the body of the porcelain perpendicular to the base of the tooth, approximately conforming to the lateral outline of the body of the same, but so shaped that the frame of the anchor extends into the porcelain from an eye or head adapted to be embedded in the plate material, said frame being adapted furthermore to be of the form of limbs that branch out downwardly and upwardly into the porcelain, thus materially strengthening the porcelain against fracture on a horizontal line of the same.

The invention is satisfactorily illustrated in the accompanying drawing, but the important instrumentalities thereof may be varied, and so it is to be understood that the invention is not limited to the specific details shown and described.

Figure 1:
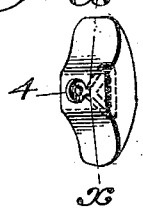
Figure 2:
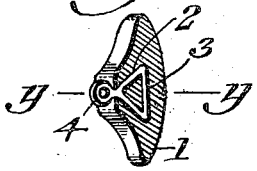
Figure 3:
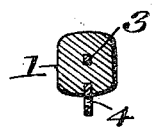
Figure 4:
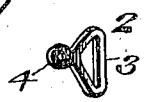

Figure 1 represents a perspective view of an artificial tooth having a fastening embodying my invention applied thereto. Fig. 2 represents a section thereof on line *x—x* Fig. 1. Fig. 3 represents a section thereof on line *y—y* Fig. 2. Fig. 4 represents a perspective view of the fastening detached from the tooth.

The remaining figures represent perspective views of other forms of my invention.

Similar numerals of reference indicate corresponding parts in the figures.

Referring to the drawings:—1 designates an artificial tooth of usual construction.

2 designates an attachment or anchor for connecting the tooth with the mouth plate, the same being composed of the flat plate member 3 with an opening forming an eye therein and the eye 4, the latter projecting outwardly from said anchor at the outer end thereof, it being noticed that the anchor is embedded in the tooth and baked in therewith, while the eye 4 is exterior of the tooth. Some of the material of the tooth is adapted to enter the eye member 3 and thus forms an interior lock for the latter with the tooth while some of the material of the plate is adapted to enter the eye 4, and thus forms an interior lock for the eye 3 with said plate. The anchor and the eye may be stamped out of suitable metal or material, or cast or otherwise produced therefrom.

It will be noticed that the anchor is composed of an open frame and occupies a position in the porcelain of the tooth perpendicular to the base of the same. As the anchor is of open form some of the material of the tooth enters the same and takes hold thereof, and as other portions of the material of the tooth surrounds the anchor, the latter will be interlocked with the tooth within the same whereby the tooth will be doubly connected with said member 3 and prevented from being withdrawn therefrom, while the eye 4 is adapted to be embedded in the mouth plate and interlocked therein, thus doubly interlocking the plate material with said eye 4, by which provision the tooth and plate will be fastened together in a firm and secure manner.

Figure 5:

In Fig. 5, the anchor is of the form of a bifurcation or branches as a divided eye 7 with shoulders 8 on the ends thereof.

Figure 6:

In Fig. 6, the anchor is of the form of a plurality of open-frames 9 with the offset bend 10 connecting the same, said bend having an opening therein serving as the exterior eye.

Figure 7:

In Fig. 7, the anchor is of the form of inturned segmental branches 11 forming a divided eye.

Figure 8:

In Fig. 8, the anchor is of the form of an eye 12 with points or spurs thereon and the connecting eye 4.

Figure 9:
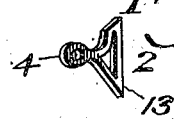

In Fig. 9, the anchor is an angular shaped open frame 13 whose upper side is both right lined and concave.

Figure 10:
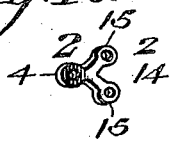

In Fig. 10, the anchor is of the form of a bifurcation or branches 14 in the ends of the limbs of which are the eyes 15 forming a plurality of eyes to be embedded in a tooth.

Attention is drawn to the fact that an artificial tooth has been made with a headed pin that enters the body of the porcelain from the rear face thereof, about midway from the biting edges to the neck or gum margin. Such pin has a head on both ends, one end holding in the porcelain, and the other head holding in the plate material, thus practically holding the tooth to the plate. The headed end that holds the teeth to the plate is seldom pulled away, but the tooth breaks away from the headed end that enters the porcelain, and the line of fracture is often horizontal on a line with the pin through the porcelain.

One or more of these anchors may be utilized in each tooth. Some teeth are of necessity short, hence an anchor like Figs. 7 or 8 is more particularly adapted for a bicuspid or a molar which break seldom on the pin line.

Having thus described my invention what I claim as new and desire to secure by Letters Patent, is:—

A fastening for an artificial tooth with the mouth plate therefor composed of a double eye member, the eye of one member having flaring walls embedded solidly within the tooth in a direction perpendicularly to the base of the tooth and interlocked internally therewith by material of the tooth occupying the opening of said eye, and the eye of the other member being exterior of the eye member in the tooth and parallel therewith, the latter named eye member being adapted to be embedded solidly within said plate and interlocked internally therewith by the material of the plate occupying the opening of said last named eye.

JAMES W. IVORY.

Witnesses:
JOHN A. WIEDERSHEIM,
N. BUSSINGER.

Copies of this patent may be obtained for five cents each, by addressing the "Commissioner of Patents, Washington, D. C."